(12) United States Patent
Aburmad et al.

(10) Patent No.: US 12,386,183 B2
(45) Date of Patent: Aug. 12, 2025

(54) HEAD-MOUNTED IMAGE DISPLAY SYSTEM

(71) Applicant: ELBIT SYSTEMS LTD., Haifa (IL)

(72) Inventors: Shimon Aburmad, Haifa (IL); Adi Charny, Haifa (IL); Yotam Gil, Haifa (IL); Liad Ben Ishai, Haifa (IL); Yaniv Toledano, Haifa (IL)

(73) Assignee: ELBIT SYSTEMS LTD., Haifa (IL)

( * ) Notice: Subject to any disclaimer, the term of this patent is extended or adjusted under 35 U.S.C. 154(b) by 0 days.

(21) Appl. No.: 19/054,966

(22) Filed: Feb. 17, 2025

(65) Prior Publication Data

US 2025/0199318 A1 Jun. 19, 2025

Related U.S. Application Data

(63) Continuation of application No. PCT/IL2024/050727, filed on Jul. 24, 2024.

(30) Foreign Application Priority Data

Aug. 8, 2023 (IL) .......................................... 305075

(51) Int. Cl.
*G02B 27/01* (2006.01)
*G02B 17/08* (2006.01)

(52) U.S. Cl.
CPC ..... *G02B 27/0172* (2013.01); *G02B 17/0856* (2013.01)

(58) Field of Classification Search
CPC G02B 27/0172; G02B 17/0856; G02B 27/01; G02B 27/0101; G02B 27/0103; G02B 27/0149; G02B 27/017; G02B 27/0176; G02B 27/0179; G02B 27/0189; G02B 2027/0105; G02B 2027/0107; G02B 2027/0109; G02B 2027/011; G02B 2027/0112; G02B 2027/0114;
(Continued)

(56) References Cited

U.S. PATENT DOCUMENTS 5,880,888 A 3/1999 Schoenmakers et al.
6,147,807 A 11/2000 Droessler et al.
(Continued)

FOREIGN PATENT DOCUMENTS

CN 206339785 U 7/2017
EP 4137869 A1 2/2023
(Continued)

*Primary Examiner* — Henry Duong
(74) *Attorney, Agent, or Firm* — S.J. Intellectual Property Ltd.

(57) ABSTRACT

The presently disclosed subject matter aims to a head-mounted display (HMD) system including: (i) an image source configured to project one or more light beams associated with one or more respective images, (ii) a first optical element, including (a) a first receiving surface, (b) a first reflective element, and (c) a first projecting surface, at least one of which possesses optical power; (iii) a second optical element including (d) a second receiving surface, (e) a second reflective element, and (f) a second projecting surface, at least one of which possesses optical power; and (iv) an at least partially reflective element configured to enable the displaying of the one or more produced images to the user's eye while allowing said user to continue seeing the real world.

19 Claims, 4 Drawing Sheets

(58) Field of Classification Search
CPC .... G02B 2027/0116; G02B 2027/0118; G02B
2027/012; G02B 2027/0121; G02B
2027/0123; G02B 2027/0125; G02B
2027/0127; G02B 2027/0129; G02B
2027/013; G02B 2027/0132; G02B
2027/0134; G02B 2027/0136; G02B
2027/0138; G02B 2027/0141; G02B
2027/014; G02B 2027/0143; G02B
2027/0145; G02B 2027/0147; G02B
2027/015; G02B 2027/0152; G02B
2027/0154; G02B 2027/0156; G02B
2027/0158; G02B 2027/0159; G02B
2027/0161; G02B 2027/0163; G02B
2027/0165; G02B 2027/0167; G02B
2027/0169; G02B 2027/0174; G02B
2027/0178; G02B 2027/0181; G02B
2027/0183; G02B 2027/0185; G02B
2027/0187; G02B 2027/019; G02B
2027/0192; G02B 2027/0194; G02B
2027/0196; G02B 2027/0198
USPC ......................................................... 359/630
See application file for complete search history.

(56) References Cited

U.S. PATENT DOCUMENTS

| | | |
|---|---|---|
| 6,201,646 B1 | 3/2001 | Togino et al. |
| 6,310,736 B1 | 10/2001 | Togino |
| 6,487,021 B1 | 11/2002 | Ophey |
| 6,504,658 B1 | 1/2003 | Bignolles et al. |
| 2002/0034016 A1 | 3/2002 | Inoguchi et al. |
| 2003/0002166 A1* | 1/2003 | Wilmington ........... G02B 27/01 359/629 |
| 2004/0090683 A1 | 5/2004 | Nagata |
| 2004/0119664 A1* | 6/2004 | Inoguchi ............. G02B 27/0172 345/8 |
| 2005/0219671 A1 | 10/2005 | Inoguchi et al. |
| 2009/0180194 A1 | 7/2009 | Yamaguchi et al. |
| 2009/0231722 A1 | 9/2009 | Filipovich et al. |
| 2010/0109977 A1 | 5/2010 | Yamazaki et al. |
| 2011/0175799 A1 | 7/2011 | Yamada et al. |
| 2012/0229367 A1 | 9/2012 | Magyari |
| 2014/0160576 A1 | 6/2014 | Robbins |
| 2014/0375789 A1 | 12/2014 | Lou et al. |
| 2015/0153575 A1 | 6/2015 | Komatsu et al. |
| 2015/0168730 A1 | 6/2015 | Ashkenazi et al. |
| 2015/0177519 A1 | 6/2015 | Cakmakci et al. |
| 2017/0276946 A1* | 9/2017 | Yokoyama ................ G02B 5/10 |
| 2018/0335628 A1 | 11/2018 | Hung et al. |
| 2019/0278088 A1 | 9/2019 | Asaf et al. |
| 2020/0018966 A1 | 1/2020 | Komatsu et al. |
| 2020/0081235 A1 | 3/2020 | Takahashi et al. |
| 2021/0096338 A1 | 4/2021 | Saiga |
| 2021/0373338 A1 | 12/2021 | Gao et al. |
| 2022/0050299 A1 | 2/2022 | Hua et al. |
| 2022/0229300 A1 | 7/2022 | Ashkenazi et al. |
| 2022/0276492 A1* | 9/2022 | Yamaguchi ........ G02B 17/0856 |

FOREIGN PATENT DOCUMENTS

| | | | |
|---|---|---|---|
| WO | 2009136393 A1 | 11/2009 | |
| WO | 2016135727 A1 | 9/2016 | |
| WO | WO-2018223150 A1 * | 12/2018 | ......... G02B 27/0103 |
| WO | 2020212684 A1 | 10/2020 | |

* cited by examiner

HEAD-MOUNTED IMAGE DISPLAY SYSTEM

TECHNICAL FIELD

The present invention relates to the field of head-mounted image display systems.

BACKGROUND

In recent years there has been vast development in the field of head-mounted image display systems, which led to the ability to create compact optical systems capable of displaying small-scale images (e.g., a single image or a plurality of images forming a video) at a size visible to a user's eye(s), as the user is wearing the optical system.

Though numerous compact optical systems exist, these systems tend to be subjected to: (i) low efficiency (which requires that said systems be operated at high power, so as to compensate for said efficiency), (ii) occurrences of optical tolerances, (iii) events of chromatic distortion, and the like. Furthermore, these systems tend to be heavy, expensive, and difficult to manufacture, as they include components made of hefty materials such as glass and the like, which make the use of said systems burdensome.

Thus, there is a need in the art for a high-quality, lightweight, and cheap head-mounted image display system.

GENERAL DESCRIPTION

In accordance with a first aspect of the presently disclosed subject matter, there is provided a head-mounted display (HMD) including at least one optical unit configured to be associated with at least one eye of a user wearing the HMD, the optical unit comprising: (a) an image source configured to project one or more light beams associated with one or more respective images; (b) a first optical element, including: (i) a first receiving surface, (ii) a first reflective element, and (iii) a first projecting surface, wherein at least one of the first projecting surface, the first reflective element, and the first receiving surface possesses optical power; (c) a second optical element including: (i) a second receiving surface, (ii) a second reflective element, and (iii) a second projecting surface, wherein at least one of the second projecting surface, the second reflective element, and the second receiving surface possess optical power; and (d) an at least partially reflective element configured to enable the displaying of the one or more produced images to the user's eye while allowing the user to continue seeing the real world; wherein light beams projected from the image source travel along an optical path extending between the image source and the user's eye, by traveling through the first optical element and then through the second optical element towards the partially reflective element, and wherein the one or more respective images associated with the one or more light beams are reflected from the partially reflective element and are viewed by the user's eye.

In some cases, along the optical path an intermediate image is being formed.

In some cases, the intermediate image is formed in the second optical element.

In some cases, a pseudo-stop is formed in the first optical element, such that a reduction in size of the optical element is achieved.

In some cases, (i) the at least one optical unit further comprising a first lens composed of a first surface and a second surface, and (ii) the first lens is positioned therebetween the first optical element and the image source.

In some cases, (i) the at least one optical unit further comprising a second lens composed of a third surface and a fourth surface, and (ii) the second lens is positioned therebetween the first and second optical elements.

In some cases, (i) the at least one optical unit further comprising a first lens and a second lens positioned therebetween the first optical element and the image source and the first and second optical elements, respectively, (ii) the first lens is composed of a first surface and a second surface, and (iii) the second lens is composed of a third surface and a fourth surface.

In some cases, at least one of the first and second optical elements of the at least one optical unit is a prism.

In some cases, the optical path of the at least one optical unit is extending vertically, along the y-axis.

In some cases, the optical path of the at least one optical unit is extending horizontally, along the x-axis.

In some cases, the first and second reflective surfaces of the at least one optical unit are of bi-conical or freeform form.

In some cases, the first and second optical elements of the at least one optical unit are joined together by coupling the first projecting surface and the second the receiving surface, so as to form a single optical element.

In some cases, the first and second optical elements of the at least one optical unit are found to be at a distance from one another.

In some cases, the first projecting surface, the first reflective surface, and the first receiving surface all possess optical power.

In some cases, the second projecting surface, the second reflective surface, and the second receiving surface all possess optical power.

In some cases, the at least partially reflective element includes a semi-reflective mirror coating placed on one of the reflective element's surfaces.

In some cases, the at least partially reflective element includes a semi-reflective mirror coating placed between the reflective element's surfaces, such that the semi-reflective mirror enables improved correction of see-through distortions.

In some cases, the at least partially reflective element further includes an intermediate tilted surface capable of reducing the at least partially reflective element's tilt angle so as enable the wearing of an eye wear, while the HMD is worn.

In some cases, the at least partially reflective element is coupled with a variable transmission mechanism enabling the adaptation of the reflective element to changing light conditions.

In some cases, the at least partially reflective element is coated with an electrochromic or photochromatic polymer, enabling the adaptation of the reflective element to changing light conditions.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1A:
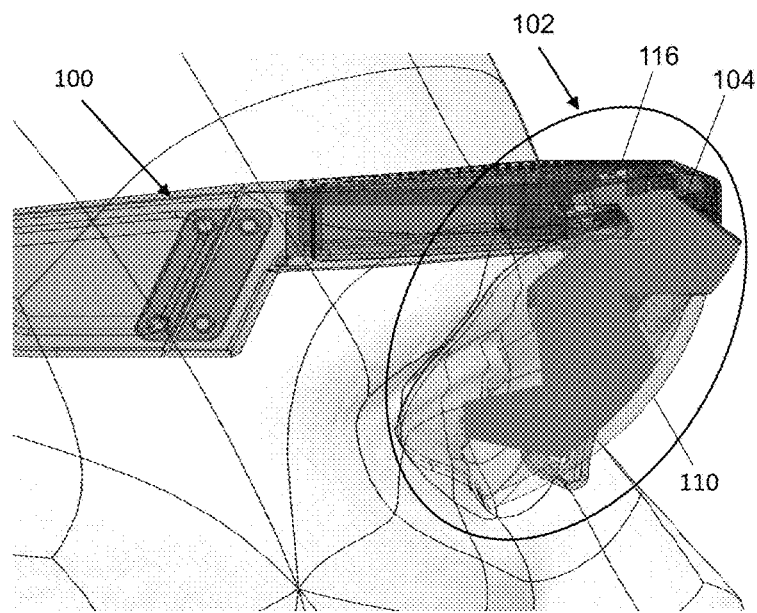
FIGS. 1A to 1D are schematic illustrations of an exemplary Head Mounted Display (HMD) system, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in a least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Any reference in the specification to a system should be applied mutatis mutandis to a method that may be executed by the system and should be applied mutatis mutandis to a non-transitory computer readable medium that stores instructions that may be executed by the system.

Bearing this in mind, attention is drawn to FIG. 1A, showing a schematic illustration of a Head Mounted Display (HMD) system, in accordance with the presently disclosed subject matter.

Figure 1B:
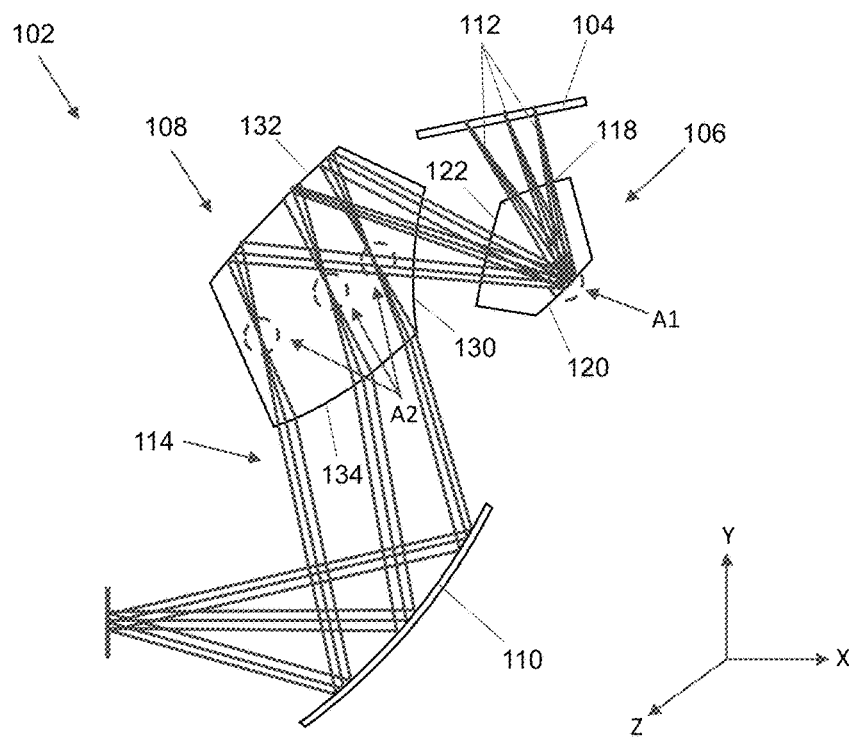

As shown in the schematic illustration, HMD system 100, which may be a stand-alone apparatus (e.g., an optical monocular, optical glasses, optical binoculars, and the like) or a component of a headgear (e.g., a helmet, and the like), contains one or more optical units, denoted 102, which may operate dependently or independently of one another. As illustrated in FIG. 1B, each optical unit 102 may be composed of: (i) an image source 104, (ii) a first optical element 106, (iii) a second optical element 108, and (iv) an at least partially reflective element 110.

In a first non-limiting example, the HMD system 100 may be an optical monocular composed of a single optical unit 102 mounted in front of a user's eyes. In a second non-limiting example, the HMD system 100 may be an optical binocular composed of two separate optical units 102, each of which is mounted in front of a different eye of the user, enabling displaying to said user's eyes either a fully overlapped output, a partially overlapped output, or a non-overlapped output.

In some cases, HMD system 100 may include an inter-pupillary distance (IPD) adjustment mechanism (not shown) directed to enable mechanical adaptation of the positioning of the one or more optical units 102, both to the pupil(s) of the user's eye(s) and relative to each other. The inter-pupillary distance (IPD) adjustment mechanism may include a mechanical mean, such as a pully, and the like, intended to enable said mechanical adaptation's operation.

Attention is now directed to each of components 104 to 110.

Figure 1C:
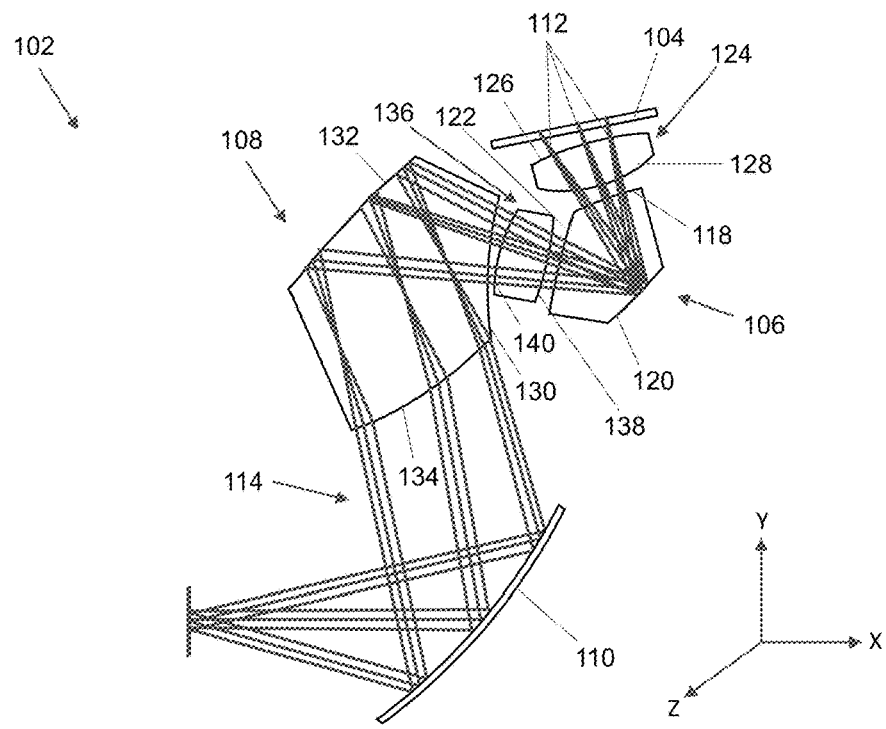
Figure 1D:
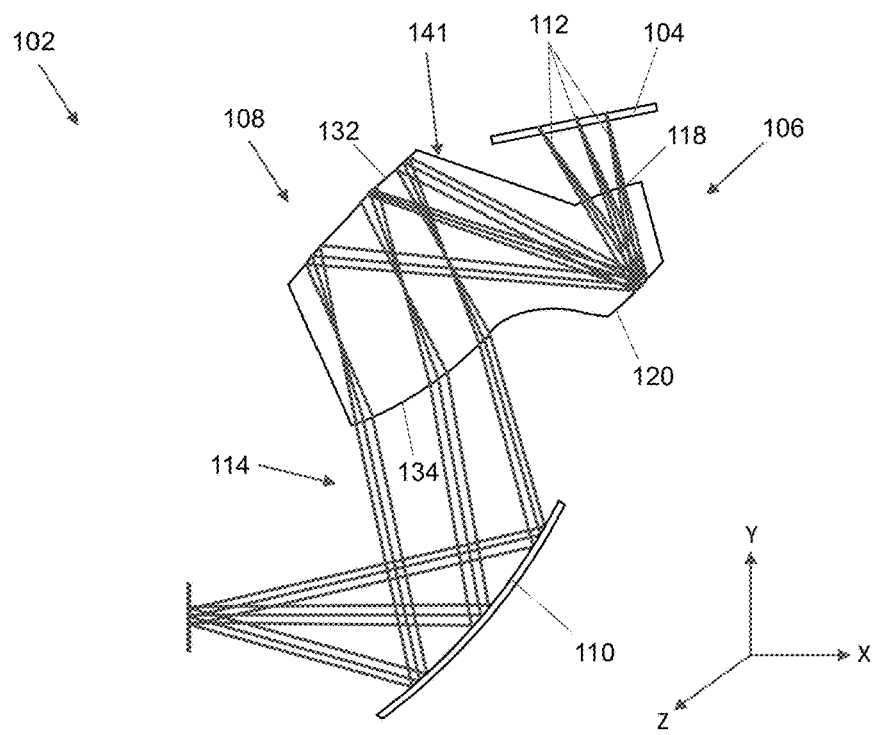

Initially, reference is made to image source 104. Image source 104, which may be, for example, a projector such as an LCD projector, an OLED projector, a Micro LED projector, an LCOS projector, and the like, may be directed to produce small-scale images intended to be displayed to the user's eye(s), at a certain visual size and/or distance. As illustrated in FIGS. 1B-1D, the produced small-scale images may be associated with one or more light beams, denoted 112, directed to travel along an optical path 114, at the end of which the produced small-scale images are displayed on the user's eye(s) (e.g., the user's eye(s) retina, as will be explained in detail hereinafter).

Image source 104 may be situated on different surfaces of HMD system 100 (e.g., the top surface, the bottom surface, side surfaces, etc.), such that the optical path through which the one or more light beams 112 travel to the user's eye(s) may extend along various spatial axes of the HMD system 100 (e.g., (i) the x-axis, extending between the user's ears, (ii) the z-axis, extending from the HMD system 100 towards the horizon, perpendicular to x-axis, or (iii) the y-axis, extending perpendicular to the x-axis and z-axis), in each of their directions (e.g., top-bottom, bottom-top, left-right, right-left, etc.). In one non-example, as illustrated in FIG. 1A, image source 104 may be situated on the top surface of HMD system 100, denoted 116, above the user's eye, such that the small-scale images may be projected to the user's eye(s) vertically, from top to bottom, along the HMD system's y-axis.

In some cases, in addition to its innate projecting capabilities, image source 104 may possess sensing capabilities, enabling it to track the user's eye(s) along similar optical path as the projected light beams and adjust the image projection it produces accordingly.

Figure 3:
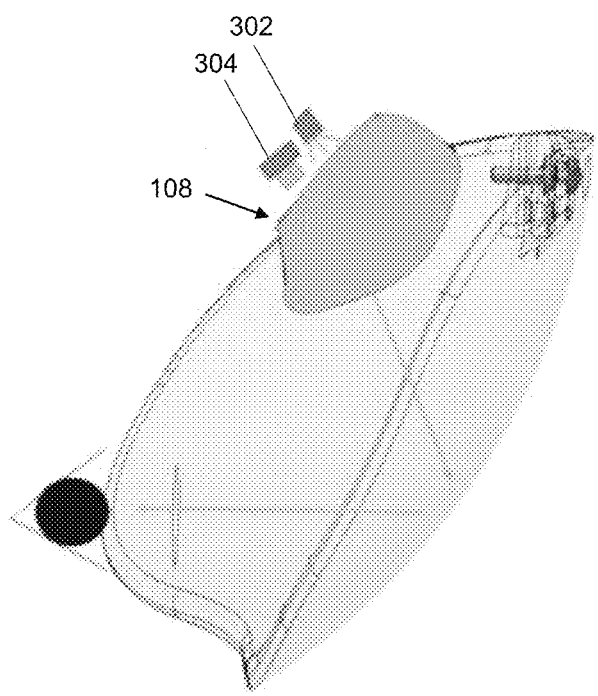

In other cases, alternatively or additionally to the former, eye-sensing capabilities may be added by exploiting the void inherently generated above the second element 108 (i.e., above second reflective surface 132, presented hereinafter). In one non-limiting example, as illustrated in FIG. 3, this may be achieved by the second reflective surface 132, presented hereinafter, being a semi-reflective mirror configured to reflect the visible light while transmitting light in the near IR (NIR) wavelength range. In cases of such type, a NIR light source 302 and a sensor coupled with appropriate optics 304 may be placed within said void so as to capture the eye/iris/pupil and allow eye sensing (e.g., pupil tracking, blinking, and such).

Similarly, in a second non-limiting example, the same can be achieved by converting the first reflective surface 120, presented hereinafter in relation to the first optical element 106, to a semi-reflective mirror, and placing a NIR light source and a sensor coupled with appropriate optics behind said surface.

Next, reference is made to the first optical element 106. First optical element 106, which may be positioned within a projection range of image source 104, may be composed of: (i) a first receiving surface 118, (ii) a first reflective surface 120, and (iii) a first projecting surface 122.

Each of said surfaces may possess optical power, originating from the surface's shape (which may be, for example, of concave or convex form), enabling it to cause a change in the propagation direction of the light beams refracting therethrough the first optical element 106 and direct them forward along the optical path 114. In one non-limiting example, the first optical element 106 may be a bi-conic optical prism composed of surfaces having optical power intended to direct light beams refracting through optical element 106 toward the second optical element 108.

In some cases, the first optical element 106 may be situated adjacent to the image source 104, creating little to no space between both elements. In such cases, the little to no space between the image source 104 and the first optical element 106 enables the latter to gather all the light beams transmitted from said image source, thereby enabling maximal energy exploitation.

In other cases, alternatively to the above, as illustrated in FIG. 1C, the space between the image source 104 and the first optical element 106 may be occupied by a first lens 124, composed of a first surface 126 and a second surface 128, situated adjacent to the image source 104. The first lens 124 may be directed to gather all the light beams transmitted from said image source and direct them toward the first optical element 106.

Aside from preventing any rays from escaping said first optical element 106 (thereby increasing the optical efficiency of the design), adding optical components (e.g., first lens 124) to the design, at any point of said design, may enhance the image quality.

It is to be of note that the description above serves as a mere example and that the first optical element 106 may include fewer or more surfaces than those described hereinbefore.

Reference is now made to the second optical element 108. Second optical element 108, which may be positioned within a projection range of the first optical element 106, may be composed of: (iv) a second receiving surface 130, (v) a second reflective surface 132, and (vi) a second projecting surface 134. Each of said surfaces may possess optical power, originating from the surface's shape (which can be, for example, of concave or convex form), enabling it to cause a change in the propagation direction of the light beams refracting therethrough the second optical element 108, and direct them forward along the optical path 114. In a non-limiting example, the second optical element 108 may be a bi-conic optical prism composed of surfaces having optical power intended to direct light beams refracting through optical element 108, toward the at least partially reflective element 110.

In some cases, each of surfaces 130 to 134 may have a relatively large aperture size, allowing for a larger EMB (Eye Motion Box), thereby eliminating the need for the optical unit(s) to be precisely in line with the user's pupil(s). In addition, we define a point within the optical system, where all the rays converge so that they almost cover the same area, as a "pseudo-stop". As illustrated, for example, in FIG. 1B, such a point is realized in area A1. By implementing a pseudo-stop in area A1, a reduction in size of optical element 106 may be achieved. Moreover, a smaller pseudo-stop may improve image quality as well as result in a smaller aperture of surfaces 118 to 122 relative to surfaces 130 to 134. The reduction in size of first optical element 106 may prevent it from obstructing the user's vision, for example, as the user is looking upwards.

It is to be of note that the description above serves as a mere example and that the second optical element 108 may include fewer or more surfaces than those described hereinbefore.

In some cases, the second optical element 108 may be situated adjacent to the first optical element 106, creating little to no space between both elements. In such cases, the little to no space between the first optical element 106 and the second optical element 108 enables the latter to gather all the light beams that traveled from said optical element 106 to it, thereby enabling maximal energy exploitation.

In other cases, alternatively to the above, as illustrated in FIG. 1C, the space between the first optical element 106 and the second optical element 108 may be occupied by a second lens 136, composed of a third surface 138 and a fourth surface 140, situated adjacent to the first optical element 106. The second lens 136 may be directed to gather all the light beams exiting said optical element 106 and direct them towards said optical element 108, in a relatively straight manner, while preventing the escape of any rays from said second optical element 108 (thereby improving image quality and increasing the optical efficiency of the design).

In additional cases, alternatively to the above, as illustrated in FIG. 1D, the first optical element 106 and the second optical element 108 may be joined together by coupling the first projecting surface 122 to the second receiving surface 130, so as to form a single unified optical element, denoted 141.

It is important to note that by using a multi-surface element, such as first optical element 106, second optical element 108, and/or single optical element 141, having a plurality of surfaces fixed to one another as part of the optics manufacturing process, the relative positioning tolerances between said surfaces may be reduced. This feature is enhanced as the number of surfaces increases.

Reference is now made to the at least partially reflective element 110. The at least partially reflective element 110 (e.g., a visor, and the like), which may be positioned within a first projection range from the second optical element 108 and a second projection range from the user's eye, may be partially reflective and partially transparent, such that it may enable the displaying of the one or more produced images to the user, while allowing said user to continue seeing the real world.

Figure 2A:
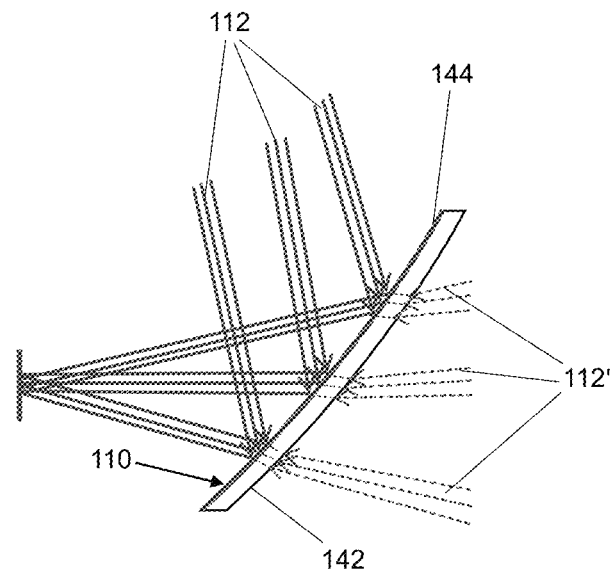
FIGS. 2A to 2C are schematic illustrations of an exemplary at least partially reflective element of a Head Mounted Display (HMD) system, in accordance with the presently disclosed subject matter; and, FIG. 3 is a schematic illustration of an exemplary optical element of a Head Mounted Display (HMD) system, in accordance with the presently disclosed subject matter.
Figure 2B:
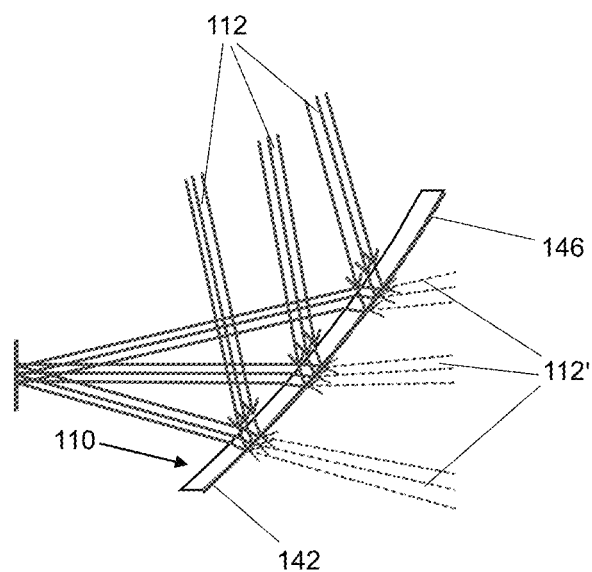
Figure 2C:
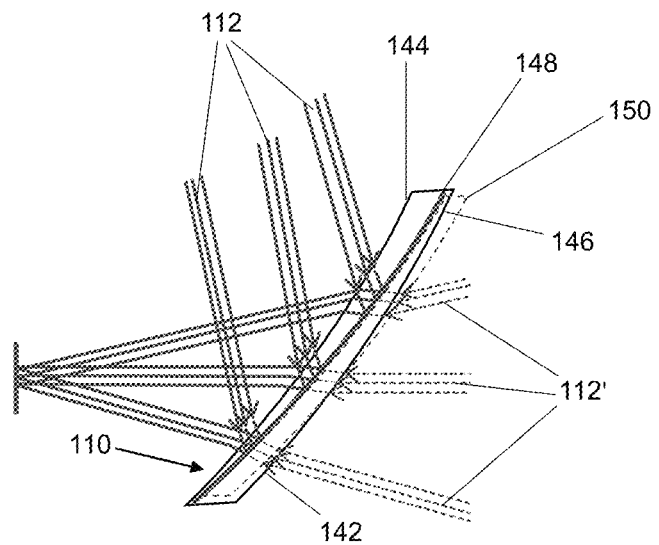

In some cases, as illustrated in FIGS. 2A to 2C, the at least partially reflective element 110 may include a semi-reflective mirror coating 142 placed on either: (i) the surface closer to the user's eye(s) (surface 144, shown in FIG. 2A), (ii) the surface farther from the user's eye(s) (surface 146, shown in FIG. 2B), or (iii) between said surfaces (surface 148, shown in FIG. 2C).

In cases where the semi-reflective mirror is placed on the surface farther from the user's eye(s) (i.e. surface 146), the light beams 112 may be refracted by surface 144 and then reflected by the semi-reflective mirror at surface 146. In addition, see-through light beams, denoted 112', associated with see-through images of the user's surrounding, may be refracted twice, a first time by surface 144 and a second time by surface 146. Such a scenario allows the at least partially reflective element 110 to possess a stronger optical effect on the projected image rays (i.e., light beams 112).

Alternatively, in cases where the semi-reflective mirror coating 142 is placed between the surfaces (i.e., FIG. 2C), in addition to the double refraction attribute described above, the semi-reflective mirror may allow improved correction of see-through distortions, by decoupling the reflection from surface 148 of the projected image, associated with light beams 112, as well as the see-through images, associated with said see-through light beams. Moreover, including an intermediate tilted surface (i.e., surface 148) within said at least partially reflective element 110 may allow the reduction of the tilt angle of the whole element (as illustrated by the dashed lines, denoted 150, in FIG. 2C). Reduced tilt angle may allow a more comfortable use of an eyewear, e.g., eye glasses, night vision goggles, and the like, while wearing the HMD system 100.

In some cases, the at least partially reflective element 110 may be coupled with a variable transmission mechanism enabling the adaptation of the reflective element to changing conditions, e.g., light conditions. In other cases, the at least partially reflective element 110 may be coated with an electrochromic and/or photochromatic polymer, which may also enable the adaptation of the reflective element to the changing conditions. Both the variable transmission mechanism and the electrochromic and/or photochromatic coating may allow displaying of designated output (e.g., the one or more produced images) to the user's eye without impairing the output's quality in light of the changing conditions.

Attention is now directed to several non-limiting examples of potential optical paths, each associated with a respective schematic illustration of the schematic illustrations presented hereinbefore in relation to HMD system 100.

By way of a first non-limiting example (presented merely for purposes of better understanding the disclosed subject matter and not in any way intended to limit its scope), in accordance with the illustration presented in FIG. 1B, the optical path 114 of one or more light beams 112, associated with one or more small-scale images produced by the image source 104, may be as follows:

(a) Initially, the one or more light beams 112 travel from the image source 104 toward the first optical element 106;

(b) Upon arrival at the first optical element 106, the one or more light beams 112 refract into the cavity of the first optical element 106, through the first receiving surface 118, and propagate toward the first reflective surface 120;

(c) At the encounter of the one or more light beams 112 with the first reflective surface 120 (denoted "A1"), a pseudo-stop is created on surface 120, and the one or more light beams 112 are then directed toward the first projecting surface 122;

(d) Upon reaching the first projecting surface 122, the one or more light beams 112 refract through the first projecting surface 122 and propagate toward the second optical element 108;

(e) With the arrival of the one or more light beams 112 at the second optical element 108, the one or more light beams 112 refract into the cavity of the second optical element 108, through the second receiving surface 130 and propagate toward the second reflective surface 132;

(f) At the encounter of the one or more light beams 112 with the second reflective surface 132, the one or more light beams 112 are directed towards the second projecting surface 134, and an intermediate image within the second optical element 108 may be formed (denoted "A2");

(g) Upon reaching the second projecting surface 134, the one or more light beams 112 refract through the second projecting surface 134 and propagate toward the at least partially reflective element 110;

(h) At the encounter of the one or more light beams 112 with the at least partially reflective element 110, the one or more light beams 112 are reflected toward the user's eye to produce said one or more images associated with said one or more light beams 112 on the user's eye retina.

By way of a second non-limiting example (presented merely for purposes of better understanding the disclosed subject matter and not in any way intended to limit its scope), in accordance with the illustration presented in FIG. 1C, the optical path 114 of one or more light beams 112, associated with one or more small-scale images produced by the image source 104, may be as follows:

(i) Initially, the one or more light beams 112 travel from the image source 104 to the first lens 124;

(j) Upon arrival at the first lens 124, the one or more light beams 112 refract into the cavity of the first lens 124, through the first surface 126, and propagate toward the second surface 128;

(k) Once at the second surface 128, the one or more light beams 112 refract through the second surface 128 and propagate toward the first optical element 106;

(l) Upon arrival at the first optical element 106, the one or more light beams 112 refract into the cavity of the first optical element 106, through the first receiving surface 118 and propagate toward the first reflective surface 120;

(m) At the encounter of the one or more light beams 112 with the first reflective surface 120, a pseudo-stop is created on surface 120, and the one or more light beams 112 are then directed toward the first projecting surface 122;

(n) Upon reaching the first projecting surface 122, the one or more light beams 112 refract through the first projecting surface 122 and propagate toward the second lens 136;

(o) Once at the second lens 136, the one or more light beams 112 refract into the cavity of the second lens 136, through the third surface 138, and propagate toward the fourth surface 140;

(p) With the arrival at the fourth surface 140, the one or more light beams 112 refract through the fourth surface 140 and propagate toward the second optical element 108;

(q) Once at the second optical element 108, the one or more light beams 112 refract into the cavity of the second optical element 108, through the second receiving surface 130, and propagate toward the second reflective surface 132;

(r) At the encounter of the one or more light beams 112 with the second reflective surface 132, the one or more light beams 112 are directed towards the second projecting surface 134, and an intermediate image within the second optical element 108 (similar to FIG. 1B) may be formed;

(s) Upon reaching the second projecting surface 134, the one or more light beams 112 refract through the second projecting surface 134 and propagate toward the at least partially reflective element 110;

(t) At the encounter of the one or more light beams 112 with the at least partially reflective element 110, the one or more light 112 beams are reflected toward the user's eye to produce said one or more images associated with the one or more light beams 112 on the user's eye retina.

By way of a third non-limiting example (presented merely for purposes of better understanding the disclosed subject matter and not in any way intended to limit its scope), in accordance with the illustration presented in FIG. 1D, the optical path 114 of one or more light beams 112, associated with one or more small-scale images produced by the image source 104, may be as follows:

(u) Initially, the one or more light beams 112 travel from the image source 104 toward the single unified optical element 141;

(v) Upon arriving at the single unified optical element 141, the one or more light beams 112 refract into the cavity of the single unified optical element 141, through the first receiving surface 118, and propagate toward the first reflective surface 120;

(w) At the encounter of the one or more light beams 112 with the first reflective surface 120, a pseudo-stop is created on surface 120, and the one or more light beams 112 are then directed toward the second reflective surface 132 of the single unified optical element 141;

(x) At the encounter of the one or more light beams 112 with the second reflective surface 132, the one or more light beams 112 are directed towards the second projecting surface 134, and an intermediate image (similar to FIG. 1B) may be formed;

(y) Upon reaching the second projecting surface 134, the one or more light beams 112 refract through the second projecting surface 134 and propagate toward the at least partially reflective element 110;

(z) At the encounter of the one or more light beams 112 with the at least partially reflective element 110, the one or more light beams 112 are reflected toward the user's eye to produce said one or more images associated with the one or more light beams 112 on the user's eye retina.

It should be noted, in relation to the non-limiting examples described hereinbefore, that the formation of the intermediate image ("A2") may occur in any stage of the passage of the one or more light beams 112 within the cavity of either the second optical element 108 or the single unified optical element 141 (i.e., prior or after the encounter of the one or more light beams 112 with the second reflective surface 132).

It should be further noted that the formation of an intermediate image ("A2") as part of the optical path may lead to the elongation of the optical design while maintaining the focal length. Such elongation may assist in (i) reducing the maximal angle of incidence within the system, thereby enabling much more widened potential optomechanical tolerances (thus improving system performance), and (ii) preventing projection optics obscuration to the user's FOV (Field of View).

It should also be noted that, since during the optical path the one or more light beams 112 make a single pass through each of the various surfaces of the system 100, as each light beam passes in its entirety, the efficiency of the system is maximal.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A head-mounted display (HMD) including at least one optical unit configured to be associated with at least one eye of a user wearing the HMD, the optical unit comprising:
    (a) an image source configured to project one or more light beams associated with one or more respective images;
    (b) a first optical element, including: (i) a first receiving surface configured to refract light beams into a cavity of said first optical element, (ii) a first reflective surface configured to redirect light beams toward a first projecting surface, and (iii) the first projecting surface configured to refract light beams out of said first optical element's cavity, wherein said (i) to (iii) are fixed to one another, and wherein, of (i) to (iii), at least the first reflective surface possesses optical power;
    (c) a second optical element including: (iv) a second receiving surface configured to refract light beams into a cavity of said second optical element, (v) a second reflective surface configured to redirect light beams toward a second projecting surface, and (vi) the second projecting surface configured to refract light beams out of said second optical element cavity, wherein said (iv) to (vi) are fixed to one another, and wherein, of (iv) to (vi), at least the second reflective surface possesses optical power; and
    (d) a partially reflective element positioned to receive said light beams from the second projecting surface and reflect at least a portion of said light beams toward the user's eye to enable the displaying of the one or more produced images to the user's eye while allowing said user to continue seeing the real world;
    wherein the light beams propagate along the optical path through the first and second optical elements and the partially reflective element to produce one or more images visible to the user.

2. The head-mounted display (HMD) of claim 1, wherein along the optical path an intermediate image is being formed.

3. The head-mounted display (HMD) of claim 2, wherein the intermediate image is formed in the second optical element.

4. The head-mounted display (HMD) of claim 1, wherein (i) the at least one optical unit further comprising a first lens composed of a first surface and a second surface, and (ii) the first lens is positioned therebetween the first optical element and the image source.

5. The head-mounted display (HMD) of claim 1, wherein (i) the at least one optical unit further comprising a second lens composed of a third surface and a fourth surface, and (ii) the second lens is positioned therebetween the first and second optical elements.

6. The head-mounted display (HMD) of claim 1, wherein (i) the at least one optical unit further comprising a first lens and a second lens positioned therebetween the first optical element and the image source and the first and second optical elements, respectively, (ii) the first lens is composed of a first surface and a second surface, and (iii) the second lens is composed of a third surface and a fourth surface.

7. The head-mounted display (HMD) of claim 1, wherein at least one of the first and second optical elements of the at least one optical unit is a prism.

8. The head-mounted display (HMD) of claim 1, wherein the optical path of the at least one optical unit is extending vertically, along a y-axis.

9. The head-mounted display (HMD) of claim 1, wherein the optical path of the at least one optical unit is extending horizontally, along an x-axis.

10. The head-mounted display (HMD) of claim 1, wherein the first and second reflective surfaces of the at least one optical unit are of bi-conical or freeform form.

11. The head-mounted display (HMD) of claim 1, wherein the first and second optical elements of the at least one optical unit are joined together by coupling the first projecting surface and the second the receiving surface, so as to form a single optical element.

12. The head-mounted display (HMD) of claim 1, wherein the first and second optical elements of the at least one optical unit are found to be at a distance from one another.

13. The head-mounted display (HMD) of claim 1, wherein the first projecting surface, the first reflective surface, and the first receiving surface all possess optical power.

14. The head-mounted display (HMD) of claim 1, wherein the second projecting surface, the second reflective surface, and the second receiving surface all possess optical power.

15. The head-mounted display (HMD) of claim 1, wherein the at least partially reflective element includes a semi-reflective mirror coating placed on one of said reflective element's surfaces.

16. The head-mounted display (HMD) of claim 1, wherein the at least partially reflective element includes a semi-reflective mirror coating placed between said reflective element's surfaces, such that said semi-reflective mirror enables improved correction of see-through distortions.

17. The head-mounted display (HMD) of claim 1, wherein the at least partially reflective element further includes an intermediate tilted surface capable of reducing the at least partially reflective element's tilt angle so as enable the wearing of an eye wear, while said HMD is worn.

18. The head-mounted display (HMD) of claim 1, wherein the at least partially reflective element is coupled with a variable transmission mechanism enabling the adaptation of the reflective element to changing light conditions.

19. The head-mounted display (HMD) of claim 1, wherein the at least partially reflective element is coated with an electrochromic or photochromatic polymer, enabling the adaptation of the reflective element to changing light conditions.

* * * * *